United States Patent [19]

Lee

[11] 4,288,731

[45] Sep. 8, 1981

[54] AVERAGE VALUE TACHOMETER FOR A DISC DRIVE SERVO AND THE LIKE

[75] Inventor: Patrick S. Lee, Campbell, Calif.

[73] Assignee: Sperry Corporation, New York, N.Y.

[21] Appl. No.: 123,640

[22] Filed: Feb. 22, 1980

[51] Int. Cl.³ ............................................. G05B 5/01
[52] U.S. Cl. .................................. 318/618; 318/561; 360/78
[58] Field of Search ............... 318/561, 616, 617, 618; 360/78; 328/78 R, 78 D, 78 F, 78 S, 166, 172, 173, 175, 177

[56] References Cited

U.S. PATENT DOCUMENTS

| | | |
|---|---|---|
| 3,836,833 | 9/1974 | Harris et al. ..................... 318/618 |
| 3,969,663 | 7/1976 | Arthur et al. ..................... 318/618 |
| 4,133,011 | 1/1979 | Kurzweil, Jr. ..................... 360/78 |

Primary Examiner—J. V. Truhe
Assistant Examiner—Eugene S. Indyk
Attorney, Agent, or Firm—Thomas H. Olson; Eugene T. Battjer; William E. Cleaver

[57] ABSTRACT

In a disc pack data storage system that has a plurality of discs and a plurality of heads for coaction with the discs, a tachometer for producing a signal indicative of the radial speed of the heads with respect to the discs. At least one of the disc surfaces is a servo surface and at least one of the heads is a servo head so that in response to radial movement of the servo head a triangular position signal is produced. Sampling pulses indicative of specific radial positions of the head are derived from the position signal so that the time required for the head to move between two positions represented by adjacent sampling pulses is inversely proportional to radial head speed. Control and computing circuitry measures the time between adjacent pulses by providing a clock pulse source and counting the number of clock pulses that occur between adjacent sampling pulses. There is circuitry for controlling the specific sampling pulses employed in accordance with radial head speed and the clock pulse source is frequency controlled to achieve accuracy at all radial speeds. A digital to analog converter converts the counted clock pulses to a voltage and amplifier circuitry derives from the voltage a speed signal indicative of radial speed. Circuitry active at very low speeds serves to combine with the speed signal a signal derived by integrating motor current so that an accurate tachometer signal is produced at all radial speeds.

8 Claims, 10 Drawing Figures

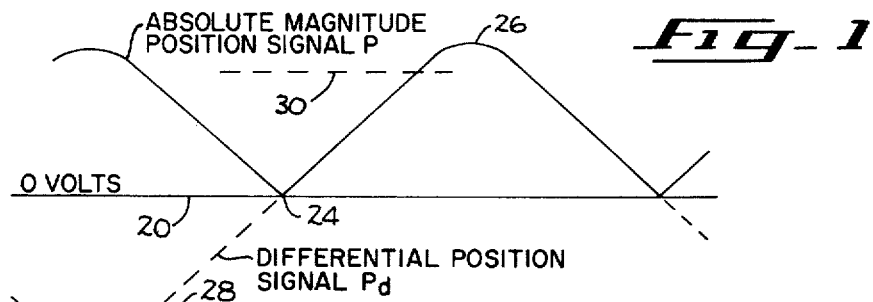
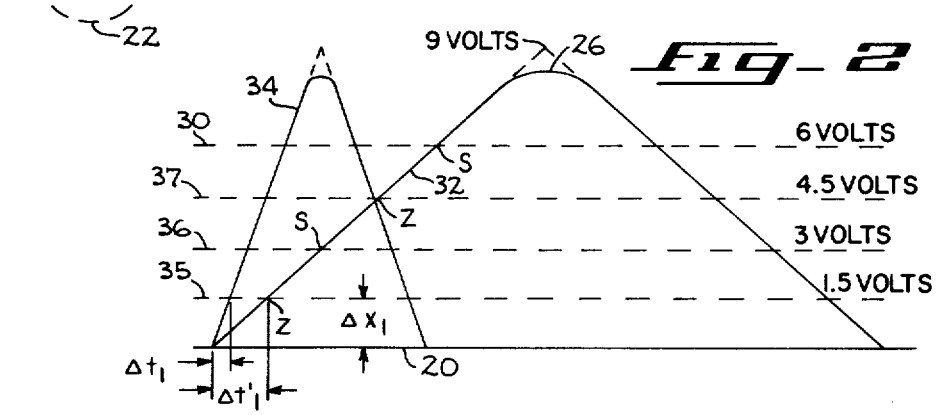
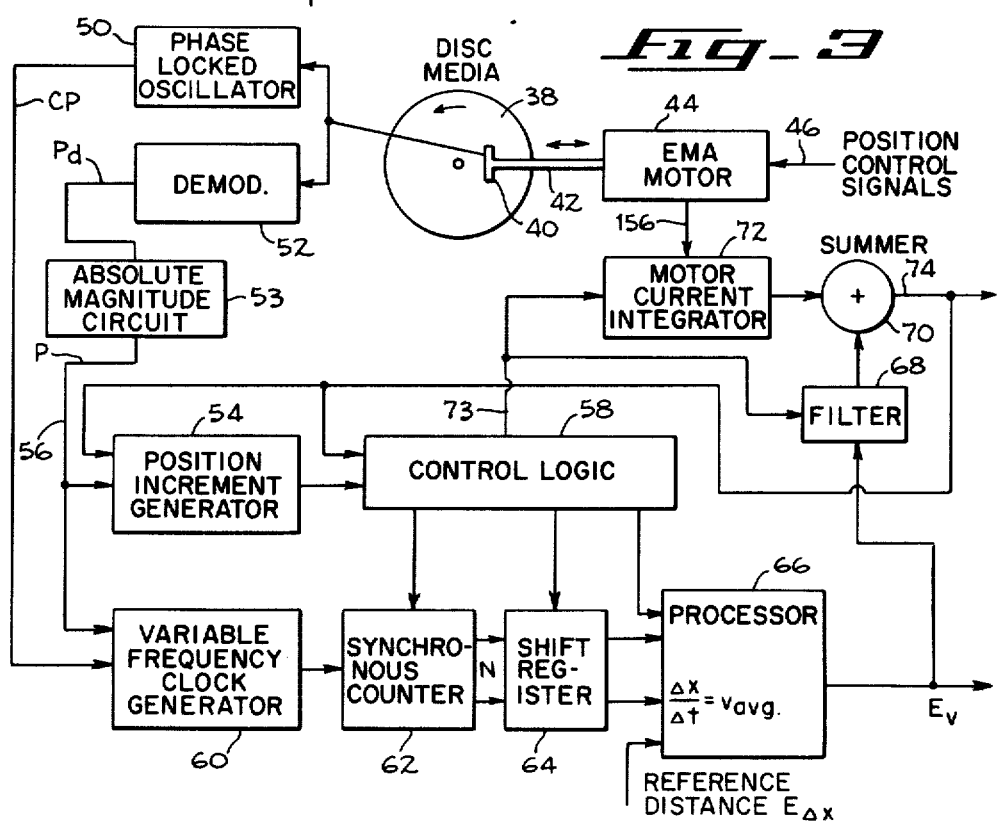

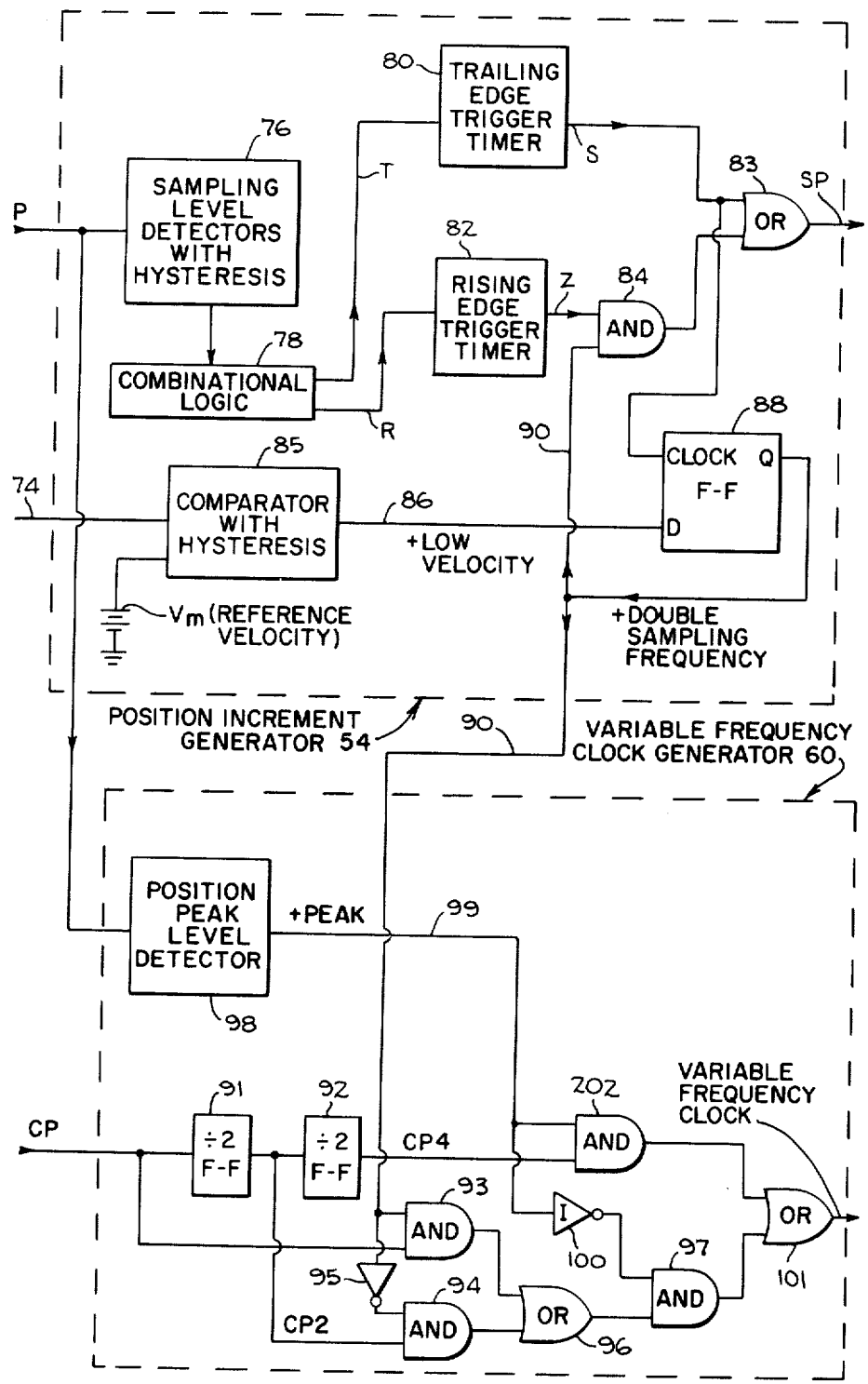
Fig_4

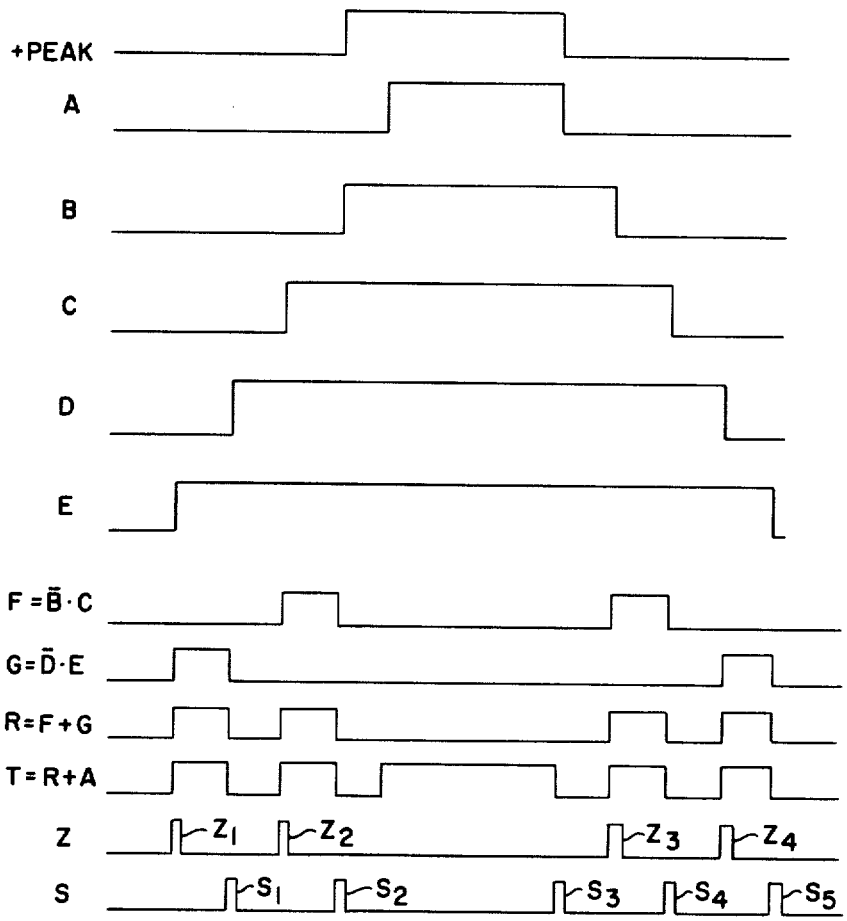

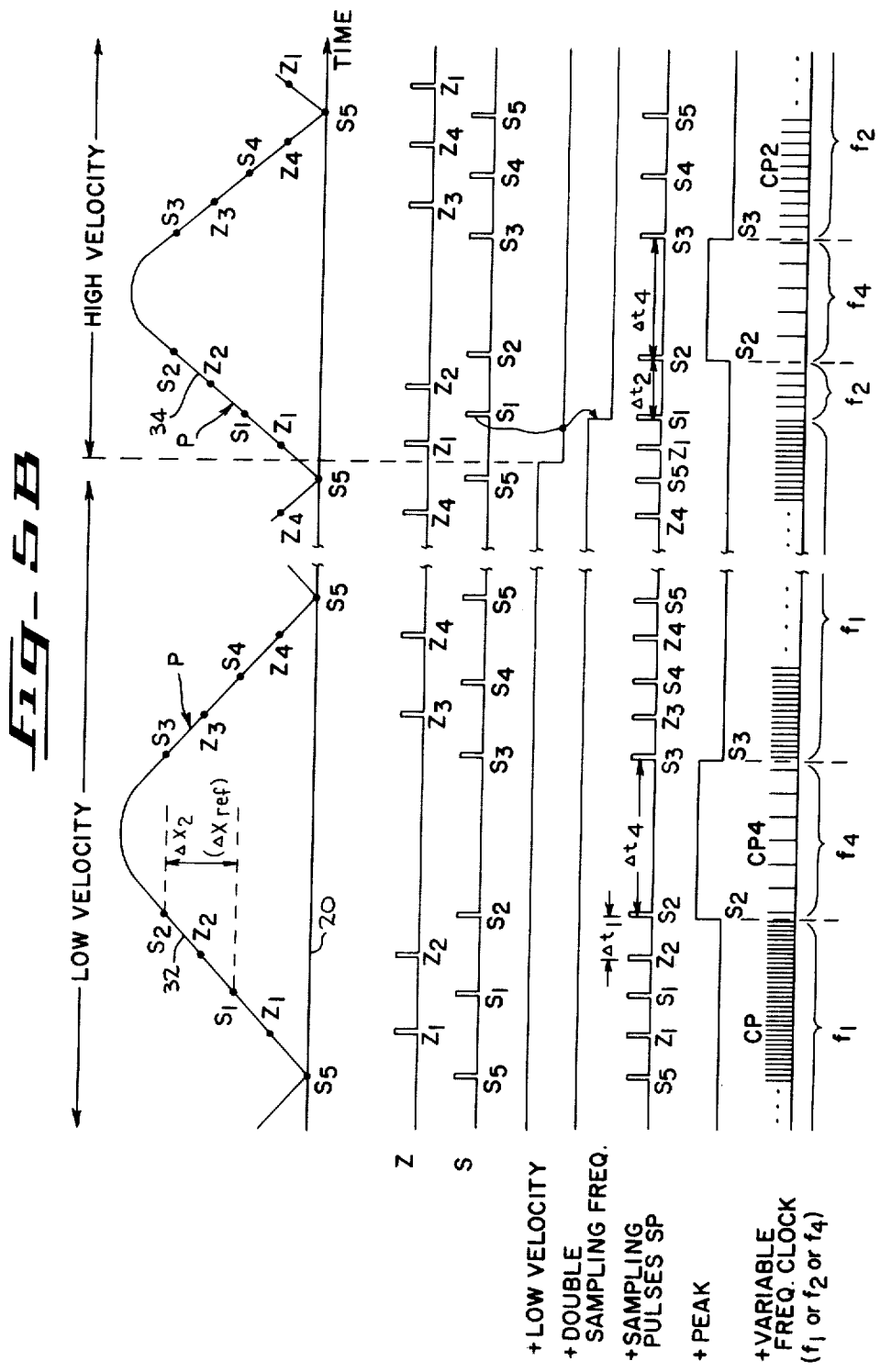

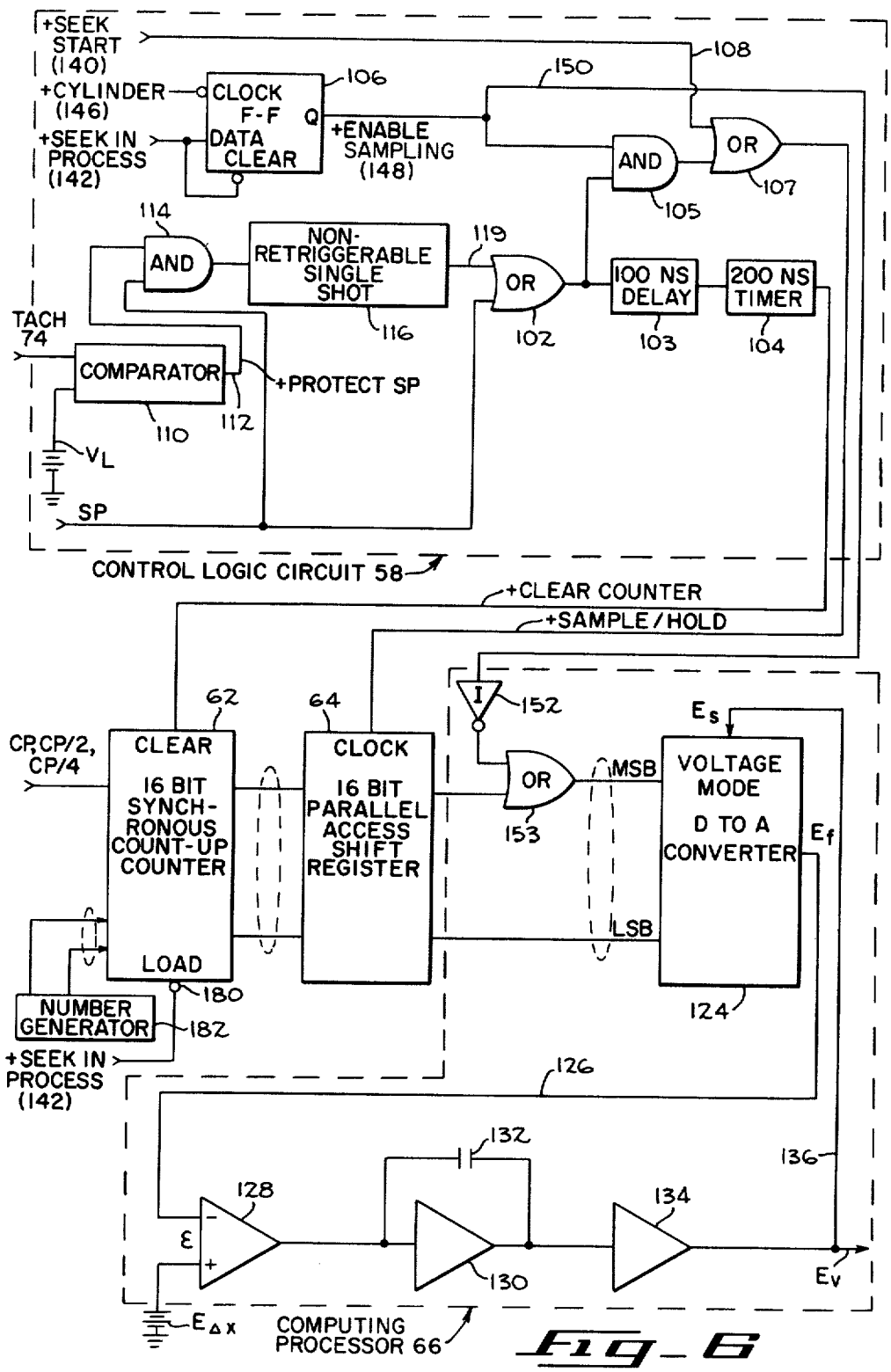

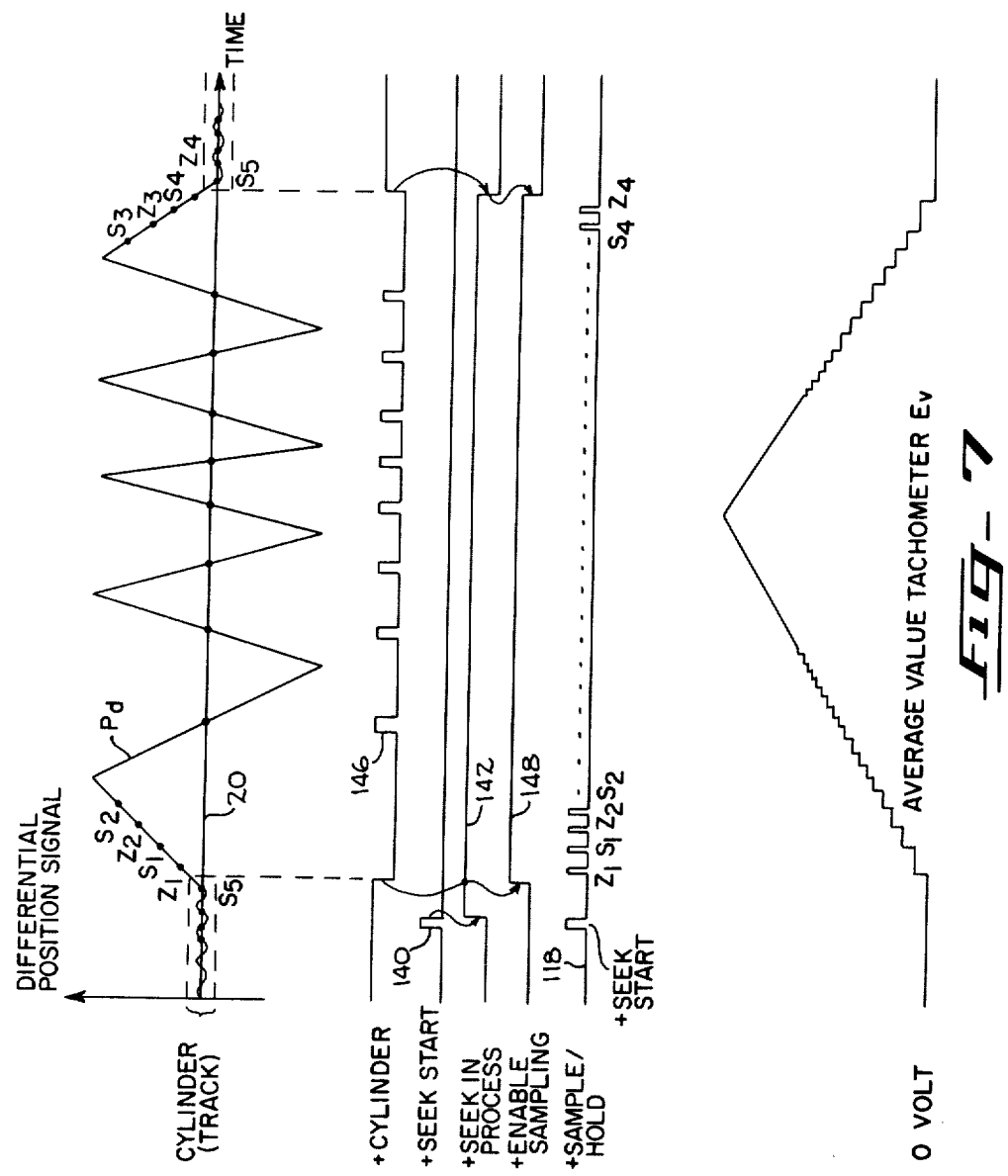

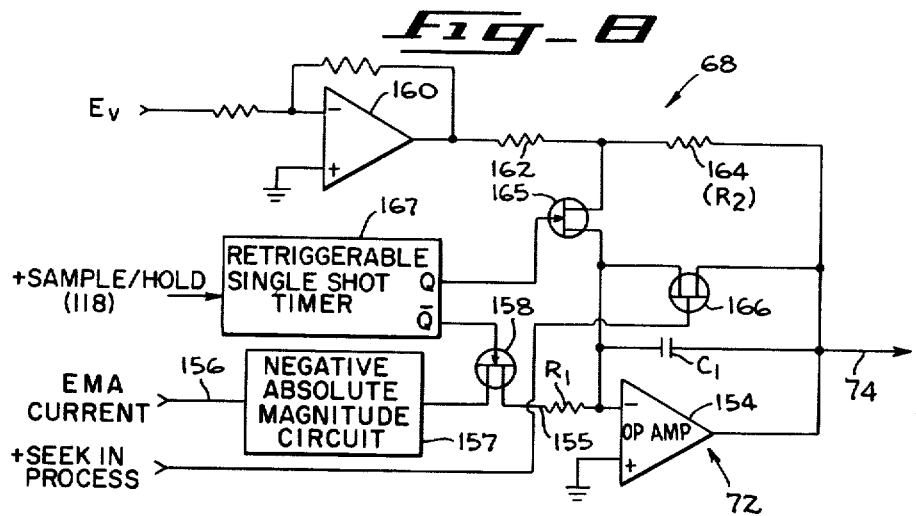
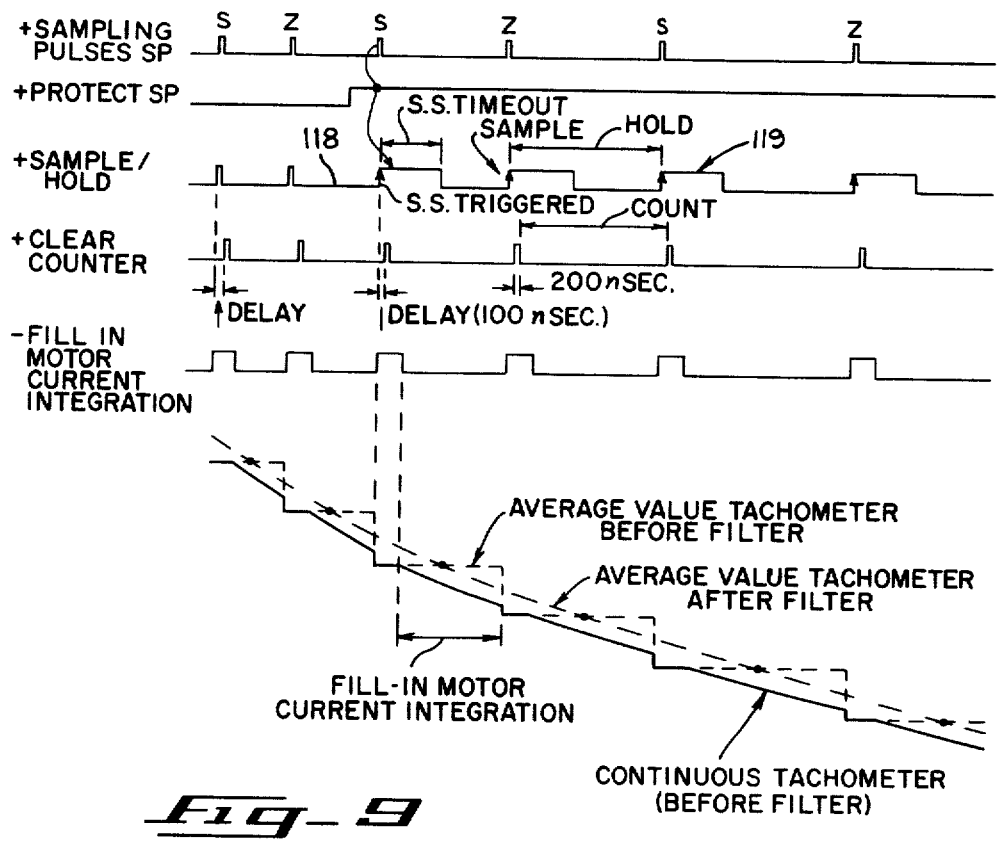

4,288,731

AVERAGE VALUE TACHOMETER FOR A DISC DRIVE SERVO AND THE LIKE

BACKGROUND OF THE INVENTION

1. Field of the Invention

This invention relates to a tachometer for measuring the speed of a periodically varying position signal that has a slope representative of speed and more particularly to a tachometer for producing a signal representative of the speed at which a magnetic head moves radially of a magnetic disc.

2. Description of the Prior Art

In disc data storage systems, data is stored on concentric tracks on a magnetic disc surface. In order accurately and quickly to access the data stored on a prescribed track, it is imperative that the speed of radial movement of the magnetic heads be measured continuously and accurately. This is recognized in the known prior art and various tachometers for producing velocity information are disclosed.

Among the known tachometer systems are those utilizing an independent transducer such as a magnetic transducer, those using an independent position transducer such as an optical system (e.g., U.S. Pat. No. 3,568,059 [cl. 324/177] to Sordello and U.S. Pat. No. 3,811,091 [cl. 328/1] to Ha et al.), those deriving a position signal from the disc pack and differentiating that signal with respect to time (e.g., U.S. Pat. No. 3,534,344 [cl. 340/174.1] to Santana), those integrating the motor current which is proportional to acceleration (e.g., Sordello, supra), and those employing two or more of the above enumerated expedients in combination. These prior art tachometers employ analog circuits to perform the velocity calculation. Not only are sophisticated analog circuits complex, but they are also limited in frequency response. The limitation of frequency response increases in importance as advancements in disc technology make possible greater and greater densities of data storage.

SUMMARY OF THE INVENTION

Disc pack servo systems typically include a servo surface prerecorded on one disc surface in a disc pack and a servo head which cooperates with the servo surface and is mounted for movement in unison with the read-write heads that cooperate with the disc data surfaces. The servo surface is prerecorded with a plurality of concentric magnetic tracks, and when the servo head moves radially of the tracks, the signal induced in the servo head varies between a maximum value when the servo head is in direct alignment with a track and a minimum value when the servo head is midway between two adjacent tracks. The servo head signal is demodulated to form a head position signal and the rate at which such position signal changes is indicative of the radial speed of the servo head.

According to the present invention, a voltage representative of a predetermined linear portion of such position signal is characterized as $\Delta x$ inch and is a constant employed in circuitry that calculates the formula $\Delta x/\Delta t =$ velocity. The time required for the position signal to vary over a physical distance $\Delta x$ is measured so that the velocity in inch/second is inversely proportional to such time. In the preferred embodiment of the invention that is described hereinafter, $\Delta t$ in second is measured by providing a precise clock pulse source and counting the number of pulses that are produced during the time required for the position signal to vary by the amount $\Delta x$.

In order to assure an accurate indication of velocity in the presence of acceleration or deceleration it is necessary to minimize the value of $\Delta x$. According to the present invention, the interval over which $\Delta x$ and $\Delta t$ are measured is reduced at low speeds and the velocity calculation is performed more often in order that the average speed calculated according to the invention will more closely approximate the actual or instantaneous speed. At higher speed, calculation of velocity is done less frequently and over longer distances in order to produce accurate results without imposing unduly stringent requirements on the computational circuitry.

In the specific embodiment of the invention that is described in greater detail hereinafter, the position signal generated from the servo head signal is divided into increments. The increments are constant in voltage to represent fixed displacement $\Delta x$ of the head. That is, they are constant in the amount of distance that each represents so that the time required for the position signal to vary one increment from one voltage level to another voltage level is representative of the velocity. Consequently, the computational portion of a tachometer embodying the present invention is relatively uncomplex because only one of its two inputs (time $\Delta t$) is variable.

The following specification therefore discloses circuitry for generating different magnitudes of $\Delta x$ at different situations and at different velocities; circuitry for generating clock pulses at different frequencies at different $\Delta x$ for the measurement of $\Delta t$; circuitry for calculating the average velocity $v_{avg} = \Delta x/\Delta t$ (inch/sec); and circuitry for properly combining the average velocity with a signal derived by integrating current to the motor that drives the head in order to generate an accurate continuous tachometer signal at very low velocity.

BRIEF DESCRIPTION OF THE DRAWINGS

FIG. 1 is a graph of voltage versus time of a position signal produced in a servo system for a disc pack drive.

FIG. 2 is a view similar to FIG. 1 showing the position signal at two different speeds and showing certain voltage levels employed in one embodiment of the invention.

FIG. 3 is a block diagram of an average value tachometer embodying the present invention.

FIG. 4 is a block diagram of portions of the block diagram of FIG. 3 and showing such portions in somewhat greater detail.

FIG. 5A is a graph depicting timing or logic signals produced by circuitry embodying the present invention.

FIG. 5B is a graph depicting operation of the device during transition from a relatively low velocity to a relatively high velocity.

FIG. 6 is a block diagram of a portion of the circuitry of FIG. 3, showing such portion in somewhat greater detail.

FIG. 7 is a graph showing generation of the tachometer signal in accordance with the invention during an entire cycle of operation.

FIG. 8 is a block diagram showing a portion of the circuit of FIG. 3 in somewhat greater detail.

FIG. 9 is a graph showing operation of the circuit of the invention as the heads are slowed preparatory to stopping at a prescribed radial location in the disc pack.

DESCRIPTION OF THE PREFERRED EMBODIMENT

Before describing the preferred embodiment that is shown in the appended drawings, the characteristics of the track following position signal derived from the disc pack servo head signal will be described. Having reference to FIG. 1, in which time is plotted on the abscissa and a voltage representative of the position of the servo head with respect to the data cylinder is plotted on the ordinate, the differential position signal $P_d$ is shown. There is a zero voltage line 20 corresponding to the radial position of the servo head when it is positioned midway between two adjacent servo tracks which defines the location of data cylinder (i.e. data tracks for read-write data heads). In such position the servo head signal is zero because the influences of the two oppositely polarized adjacent servo tracks are equal and opposite so as to cancel one another. When the servo head is aligned over one of the servo tracks, the signal induced in the head is at peak, such as indicated at 22. As the head moves toward a position midway between two adjacent servo tracks, it crosses zero voltage line 20 as at 24, and when it moves still further to alignment over the next, and oppositely polarized, servo track, a peak 26 of opposite polarity is induced in the head. Because of limitations in servo tracks magnetization and servo head characteristics, the portions of the position signal at the peaks 22 and 26 are nonlinear. More particularly, when the position signal formed by demodulating the head signal is more negative than a negative voltage level 28, the position signal is nonlinear; when the position signal exceeds a corresponding positive voltage level 30, it is likewise nonlinear. Finally, it will be understood that the slope of the linear portion of the position signal is indicative of radial head speed; the portion of the signal between voltage levels 28 and 30 has relatively flat slope at low radial speeds of the servo head and a relatively steep slope at high servo head speeds. The absolute magnitude of the position signal, P, is also shown in FIG. 1 and will be referred to as position signal hereinafter.

In FIG. 2 portions of two position signals for different radial speeds are superimposed, there being a relatively slow speed position signal 32 having a relatively flat slope and a relatively fast speed position signal 34 having a relatively steep slope. In performing the average speed computation in accordance with the present invention, there is circuitry for producing timing pulses when the position signals exceed various reference voltage levels, the voltage levels being indicated at 35, 36, 37 and 30. It is preferred that the incremental voltage between any two adjacent levels (a position increment) is likewise equal in the linear region. Each increment corresponds to a physical distance and is indicated in FIG. 2 at $\Delta x_1$. In one exemplary system designed in accordance with the present invention, the distance between adjacent data cylinders in a disc pack is 2.7 milli-inches and is represented by 18 volts of position signal; $\Delta x_1$, which is represented by 1.5 volts in the position signal, is equal to 225 micro-inches. The time required for the relatively fast signal 34 to traverse the distance $\Delta x_1$ is indicated in FIG. 2 as $\Delta t_1$; the time for the relatively slow signal 32 to traverse the same distance $\Delta x_1$ is indicated as $\Delta t_1'$, which is larger than $\Delta t_1$. Thus the velocity calculation, $v = \Delta x / \Delta t$ will produce a relatively high velocity for $\Delta t_1$ and a relatively low velocity for $\Delta t_1'$. The system of the present invention performs these calculations to produce an accurate tachometer signal at all velocities.

The specific embodiment of the invention described hereinbelow is employed with a disc pack (see FIG. 3) having a prerecorded servo surface 38 and a servo head 40 in which signals are induced in response to relative movement between the prerecorded servo surface and the servo head. The servo head is mounted on an arm 42 which is driven by an electromagnetic actuator (EMA) motor 44 so as to move the servo head to a prescribed radial position over the servo surface. Position control signals are applied to EMA motor 44 at an input 46 so as to cause the EMA motor to position servo head 40 at a desired location.

Not shown in the drawings are data discs having data surfaces and read-write heads which read data from and record data onto such data surfaces. The read-write heads are mounted on arm 42 for movement in unison with servo head 40. When the servo head resides at a radial location midway between two servo tracks (indicated at 24 in FIG. 1), the read-write heads will be aligned over a data track on the data surfaces. Such specific radial location of the servo and read-write heads is referred to as a cylinder; there are as many cylinders in a disc pack as there are data tracks on a data surface.

Each servo track on surface 38 typically includes a series of magnetic pulses or bits which induce in the servo head, in response to rotation of the disc, a series of regularly recurring timing pulses. Such timing pulses are used to synchronize a phase locked oscillator 50. The output of phase locked oscillator 50, which is identified as CP in the drawings, is a series of precisely timed clock pulses which recur regularly at a frequency of $f_1$ Hz and which are used in calculating $\Delta t$. In the above mentioned exemplary system, $f_1$ is 12.8 mHz.

In response to radial movement of servo head 40 with respect to servo surface 38 a position signal is produced. A demodulator 52 coupled to the servo head produces the differential position signal $P_d$ shown in FIG. 1. After processing this differential position signal by an absolute magnitude circuit 53, an absolute magnitude position signal P is generated as shown in FIGS. 1 and 2.

The position signal P is coupled to a position increment generator 54 via a signal line 56. The position increment generator includes a series of voltage comparators which compare the position signal P with plural reference voltages to produce sampling pulses when the position signal moves through signal levels 20, 35, 36, 37, and 30, shown in FIG. 2. Such sampling pulses are coupled to control logic circuitry 58 which generates control signals for the portion of the system which performs the velocity calculation $v_{avg} = \Delta x / \Delta t$. Here $v_{avg}$ stands for the average velocity of the servo head when it moves across the distance $\Delta x$.

The clock pulse CP from phase locked oscillator 50 is connected to a variable frequency clock generator 60 which includes dividers and gating circuitry for producing clock pulse signals at various frequencies for deriving $\Delta t$ at different position increments $\Delta x$. The variable frequency clock generator is capable of producing clock pulse signals CP at frequency $f_1$, CP 2 at frequency $f_2 (= f_1/2)$ and CP 4 at frequency $f_4 (= f_1/4)$.

The output of variable frequency clock generator 60 is connected to a sychronous counter 62. The sychronous counter is controlled by control logic 58 so that the counter begins counting clock pulses concurrently with one of the sampling pulses (e.g. the sampling pulse produced when the position signal crosses zero voltage line 20) and stops counting concurrently with a subsequent sampling pulse (e.g. the sampling pulse produced when the position signal passes voltage level 35). Consequently, the count N accumulated in synchronous counter 62 is proportional to $\Delta t$. Such count is transferred at the subsequent sampling pulse to a shift register 64, the output of which is also proportional to $\Delta t$ and is connected as one of the two inputs of a computing processor 66. The other input to processor 66 is a reference voltage $E_{\Delta x}$ which is representative of a reference distance or position increment $\Delta x_{ref}$. The processor 66 performs the calculation $v_{avg} = \Delta x / \Delta t$ and produces an output voltage $E_v$ which is representative of the radial speed $v_{avg}$ of servo head 40. Such output, after being filtered by filter 68, is connected to a summer 70. Also connected to the summer is the output of a motor current sample integrator 72 which integrates a voltage representative of the absolute magnitude of motor current supplied to EMA motor 44. Because the motor current is proportional to acceleration of servo head 40, the motor current sample integrator produces a signal which is proportional to speed. Also connected to motor current sample integrator 72 is a signal path 73 from control logic 58 on which there is a signal that activates integrator 72 and deactivates filter 68 at selected times. Accordingly the output of the summer, indicated at 74, constitutes a continuous tachometer signal which results from the filtered average value tachometer of the invention or a signal derived from integration of motor current during very low velocity.

Position increment generator 54 is shown in greater detail in FIG. 4. The position signal P constitutes the input of the position increment generator and is connected to a sampling level detector 76. The sampling level detectors can be embodied by a plurality of operational amplifiers which function as comparators with hysteresis. For example, in the exemplary embodiment of the invention under discussion, there are five such sampling level detectors which produce logic signals A, B, C, D and E shown in FIG. 5A. Logic signal A turns on when the position signal P is near the end of the linear portion thereof at 77 and turns off after the position signal has returned to the linear portion after traversing peak 26. Because of hysteresis, the logic signal A turns off at level 30 which is below level 77. Logic signal B turns on when the position signal exceeds voltage level 30 and turns off when the position signal falls below voltage level 30 to level 37. Logic signal C turns on when the position signal exceeds voltage level 37 and turns off when the position signal drops below such voltage level to level 36. Position signal D turns on when the position signal exceeds voltage level 36 and turns off when the position signal drops below such voltage level to level 35. Voltage signal E turns on when the position signal exceeds voltage level 35 and turns off when the position signal drops below such voltage to zero voltage level 20. Because of hysteresis, the signals do not turn off in response to low amplitude noise but turn off only when the position signal is well below the prescribed voltage level.

The logic signals A-E are fed to a combinational logic circuit 78 wherein means for generating the signals F, G, R and T are present. As can be seen in FIG. 5A, $F = \bar{B}$ and C, $G = \bar{D}$ and E, R = F OR G and T = R OR A.

Signal T is coupled over a path, identified at T in FIG. 4, to a trailing edge trigger timer 80 which produces a sampling pulse S at the trailing edge of signal T. Signal R is connected on a correspondingly identified signal path to a rising edge trigger timer 82 which produces a sampling pulse Z at each rising edge of signal R. The timers 80 and 82 are embodied as nonretriggerable monostable multivibrators arranged so that the widths of sampling pulses S and Z are equal and are small compared with the interval between successive sampling pulses at the highest speed. The highest speed in the exemplary system is 75 inches/second and the widths of the sampling pulses S and Z are set at 400 nanoseconds. Sampling pulses S alone are used to establish the interval over which $\Delta t$ is measured at moderate or high speeds, and both sampling pulses S and Z are used to establish the interval over which $\Delta t$ is measured at relatively slow speeds. This is shown in FIG. 5B by a signal identified as +Sampling Pulses SP which is constituted by the combination of S and Z pulses at relatively low velocities or by S pulses alone at relatively high velocities. Sampling pulses S are connected directly to one input of an OR gate 83 and sampling pulses Z are coupled to the other input of OR gate 83 through an AND gate 84. The AND gate is enabled only at relatively slow speeds.

As can be seen in FIG. 5A, sampling pulse $Z_1$ occurs when the position signal reaches voltage level 35. Sampling pulse $S_1$ occurs when the position signal reaches voltage level 36. Sampling pulse $Z_2$ occurs when the position signal reaches voltage level 37. Sampling pulse $S_2$ occurs when the position signal reaches voltage level 30. Sampling pulse $S_3$ occurs after the position signal has passed over the peak and returns to the linear region at voltage level 30. Sampling pulse $Z_3$ occurs when the position signal returns to voltage level 37. Sampling pulse $S_4$ occurs when the position signal returns to voltage level 36. Sampling pulse $Z_4$ occurs when the position signal returns to voltage level 35. Sampling pulse $S_5$ occurs when the position signal returns to zero voltage level 20.

In order to determine whether the speed is such that only sampling pulse S is employed or is such that both sampling pulses S and Z are employed, the continuous tachometer output 74 from summer 70 (FIG. 3) is fed back to a comparator 85. Comparator 85 has an input to which is connected a reference voltage $V_m$ which is indicative of some medium speed of radial travel of the servo head. Speeds above $V_m$ are considered relatively high speeds, and speeds below $V_m$ are considered relatively low speeds. When the tachometer output 74 produces a voltage less than $V_m$, comparator 85 produces an output at a logical high state indicating that the speed of radial travel is relatively low. When the tachometer velocity is above $V_m$ the output of comparator 85 is low. The output of comparator 85 which is identified hereinafter as +Low Velocity is connected over a signal path 86 to the D input of a "D" type flip flop 88. Flip flop 88 also has a clock input which is connected to the sampling pulses S at the output of timer 80 so that if the tachometer indicates a relatively low speed, the Q output of flip flop 88 will go high when sampling pulse S clocks flip flop 88. Such Q output, referred to hereinafter as +Double Sampling Frequency, is connected over a signal path 90 to one of the inputs of AND gate 84 so that the AND gate is enabled during relatively low speeds, in consequence of which sampling signal Z is also applied to OR gate 83 at low speeds. Contrariwise, when the tachometer output indicates a relatively high speed, the signal applied on path 86 to the D input of flip flop 88 is a logical low state. Thus, when the clock input of the flip flop is triggered by the sampling pulse S, the Q output of flip flop 88 will be set low to block the Z pulse from passing through AND gate 84 to reach the input of OR gate 83. Accordingly, when the tachometer output indicates a speed greater than $V_m$, only sample pulses S appear at the output of OR gate 83, and when the tachometer output indicates a speed less than $V_m$ both sampling pulses S and sampling pulses Z appear at the output of OR gate 83.

Variable frequency clock generator 60, briefly mentioned hereinabove in connection with FIG. 3, is shown in greater detail in the lower portion of FIG. 4 and the signals illustrating its operation are shown in FIG. 5B. The output signal CP of the phase locked oscillator 50, which is at a frequency $f_1$, constitutes one of the inputs of the clock frequency generator. Signal CP is connected through a divide by 2 flip flop 91 which has an output CP 2 at a frequency $f_2 = f_1/2$. The output of flip flop 91 is connected to another divide by 2 flip flop 92, the output of which produces a signal CP 4 at a frequency $f_4 = f_1/4$. Flip flops 91 and 92 are conventional circuits.

The clock pulse signal CP is connected as one input to an AND gate 93, the other input of which is coupled to the Q output of flip flop 88 on signal path 90. The output of flip flop 91, CP 2, is connected as one input to an AND gate 94, the other input of which is connected to the output of inverter 95 which inverts the Q output of flip flop 88. The output of AND gate 93 and the output of AND gate 94 are fed to the inputs of the OR gate 96 so that the output of OR gate 96 is either the signal CP or the signal CP 2 depending on the state of signal +Double Sampling Frequency at the Q output of flip flop 88, i.e. depending on whether the velocity reported by the tachometer is below or above reference velocity $V_m$. The output of OR gate 96 forms one input of an AND gate 97. The other input of AND gate 97 is high (so as to enable AND gate 97) when the position signal is in the linear range, but is low when the position signal is in the nonlinear range near the peak 26. To provide such input for enabling or disabling AND gate 97, variable frequency clock generator 60 includes a position peak level detector 98 to which the position signal P is applied as an input. Peak level detector 98 functions to produce a logical high state signal +Peak on its output 99 when the position signal is in a nonlinear range, i.e. is above voltage level 30 seen in FIGS. 5A and 5B. Such signal is inverted by an inverter 100 before connection to AND gate 97 so that the AND gate is enabled when the position signal is in the linear range and is disabled when the position signal is in the nonlinear range. The output of AND gate 97 forms one input to an OR gate 101 which receives clock pulse signal CP or CP 2 from AND gate 97 at the linear region of the position signal and receives no pulses from AND gate 97 at the nonlinear region of position signal. The other input to OR gate 101 is constituted by the output of an AND gate 202. The latter AND gate 202 is enabled by application to one of its inputs of the output of the peak level detector 98 so that AND gate 202 is enabled only when the position signal is in the nonlinear region. The other input of AND gate 202 is constituted by CP 4. Therefore the other input of OR gate 101 receives CP 4 clock pulses from AND gate 202 during the nonlinear portion of the position signal and receives no CP 4 pulse during the linear portion of the position signal region. Consequently, the output of OR gate 101, identified in FIG. 4 as Variable Frequency Clock, constitutes with clock pulse signal CP or CP 2 or CP 4 depending on the region of the position signal and the tachometer (velocity) as shown in FIG. 5B.

The combined sampling pulses SP that appear at the output of OR gate 83 constitute one of the inputs to control logic 58, seen in greater detail in FIG. 6. The sampling pulses SP coupled to control logic circuit 58 are applied to one input of an OR gate 102, the output of which is coupled to counter 62 through a 100 nanosecond (NS) delay 103 and a 200 NS timer 104. The output of the timer 104, which is a nonretriggerable monostable multivibrator, is a series of 200 nanosecond wide pulses (identified as +Clear Counter) which are employed to clear synchronous counter 62 after the count number N appearing at the parallel output of the counter has been transferred to and stored into the shift register 64. The output of OR gate 102 is also connected as one input to an AND gate 105 which is enabled by the output of a "D" type flip flop 106 having an output Q, referred to hereinafter as +Enable Sampling. The +Enable Sampling signal is in a high state at all times when the servo head is moving radially of the disc pack. The signal +Enable Sampling is used to identify all the sampling pulses required in the calculation of $v_{avg}$ by gating the sampling pulses through the AND gate 105. The output of AND gate 105 and a +Seek Start pulse generated by circuitry not shown when the heads are to be moved from an origin cylinder to a destination cylinder at a different radial position are coupled through an OR gate 107 to a clock input of shift register 64. The output of OR gate 107 is referred to hereinafter as +Sample/Hold, the leading edge of which causes transfer of the content N of counter 62 into shift register 64 in order that the number N will be held in the shift register and displayed at the output thereof for the whole pulse period of the +Sample/Hold pulse. The count number N, which the counter reports when counting the clock pulses within $\Delta t$, is represented by 16 bits of binary digits. The +Seek Start pulse applied to OR gate 107 is active only at the commencement of radial movement of the servo head. The +Seek Start pulse also generates a signal +Seek In Process which is in a high logical state while the servo head travels radially from one cylinder to another cylinder. When the servo head departs from the origin cylinder, the +Seek In Process is in a high logical state at the data input of flip flop 106. Each time that the travelling head crosses a data cylinder and the position signal $P_d$ crosses zero voltage level 20 (see FIG. 7), a signal +Cylinder is produced, circuitry not shown. The +Cylinder signal triggers the flip flop 106 so that the flip flop generates the +Enable Sampling signal when the servo head just leaves the boundary of the origin cylinder. When the servo head arrives at the target or destination cylinder, the +Seek In Process signal is reset to a low logical state which clears flip flop 106 and causes the +Enable Sampling signal to return to a low logical state.

Control logic 58 also includes means for rendering the system substantially immune to glitches or noise spikes in the position signal. The glitches or noise spikes can generate signals that appear as control signals but occur at the wrong time and impair the accuracy of the tachometer signal at very low speeds, such as occur immediately after start up of head movement and immediately prior to termination of movement during final approach to a target cylinder. To detech such very low speeds, control logic 58 includes a comparator 110 which has a reference voltage input $V_L$ that is representative of a very low speed, for instance, a few inches per second. The continuous tachometer output 74 is applied to another input of comparator 110 so that the comparator produces at its output 112 a signal +Protect SP which is high during very low speeds. The +Protect SP signal enables an AND gate 114 so that each sampling pulse that occurs during very low speed triggers a non-retriggerable monostable multivibrator 116. Monostable multivibrator 116 produces an output pulse 119 (see FIG. 9) which has a width much greater than that of the sampling pulses SP but less than the time between successive sampling pulses at the very low speeds. Because monostable multivibrator 116 has a non-retriggerable characteristic, glitches that may be present near the sampling pulses have no influence on the output of the monostable multivibrator and, therefore, do not adversely affect accuracy by prematurely clocking the shift register 64 and resetting counter 62. This avoids transferring the wrong information (i.e. wrong count) into the shift register. Immunity from noise is achieved by combining the output of monostable multivibrator 116 and sampling pulses SP in OR gate 102 so that the wide output pulse from the monostable multivibrator covers or masks glitches occurring near a sampling pulse. Therefore, whether the output of OR gate 102 is the normal sampling pulse SP or is the wide pulse from monostable multivibrator 116 is determined by whether the tachometer reports a speed lower than $V_L$ or not. Accordingly, at speeds below $V_L$, which occur when the head is close to the origin or target cylinder, mistakes in calculation of the average value tachometer due to noisy position signal are eliminated.

The immediately preceding description applies when the head is moving away from an origin cylinder or toward a destination cylinder and the output of flip flop 106 is set high so as to enable AND gate 105. When AND gate 105 is enabled, a sampling pulse SP is first conducted through AND gate 105 and OR gate 107 to the clock input of shift register 64 as a +Sample/Hold signal, thereby shifting the number N recorded in counter 62 to the input of a D/A converter 124 through the shift register 64. In other words, shift register 64 stores the number N as the input for the D/A converter for calculation of velocity at each sampling pulse whenever the +Sample/Hold pulse signal arrives at the shift register. Counter 62 is cleared or erased by a signal +Clear Counter generated from the same sampling pulse after a 100 NS delay introduced by delay 103.

Referring to the lower portion of FIG. 6, applied to the input of counter 62 are the variable frequency clock pulses at one of the three frequencies $f_1$, $f_2$ or $f_4$. Because these clock pulses occur at regularly recurring intervals, the count accumulated in counter 62 is indicative of time. When a sampling pulse is supplied to OR gate 102, there are two important consequences. The first is that the sampling pulse generates the +Sample/Hold signal which is supplied to the clock input of shift register 64; the leading edge of +Sample/Hold signal causes the shift register to receive the count N accumulated in counter 62 and transfer the count to the output of the shift register. The shift register holds the count N until receipt of the leading edge of next succeeding pulse. The delay provided by delay circuit 103 assures sufficient time for the count from the counter to be transferred to the shift register before the content of the counter is cleared. After such delay the second consequence of the sampling pulse occurs, namely: the delayed SP pulse triggers 200 NS timer 104 to form a +Clear Counter pulse to clear the counter so as to prepare it for counting the succeeding series of clock pulses in the next $\Delta x$ position increment. The 200 NS timing of the timer 104 is chosen so that it is long enough to ensure that the counter can be cleared under the worst case, but short enough that the accuracy of velocity calculation is not affected.

The number N outputted from shift register 64 is indicative of the time between successive sampling pulses, i.e. N is indicative of $\Delta t$. This number is supplied to a voltage mode digital to analog (D/A) converter 124. The number N is converted by the D/A converter into a voltage level $E_f$, the magnitude of which is likewise indicative of N. Such voltage level $E_f$ is connected over a circuit path 126 to one input of a differential amplifier 128. To the other input of differential amplifier 128 is connected a reference voltage $E_{\Delta x}$, a voltage signifying $\Delta x_2$ which is also referred to as a reference distance $\Delta x_{ref}$ as seen in FIG. 5B. To facilitate the following mathematical explanation of calculation of the equation $v_{avg} = \Delta x/\Delta t$ (in/sec) $= E_v$ volts, the difference between the inputs to differential amplifier 128 is designated $\epsilon$. The output of differential amplifier 128 is connected to a high gain amplifier 130 having a feedback or integrating capacitor 132 to establish frequency compensation. The output of amplifier 130 is connected to an emitter follower buffer amplifier 134. The voltage output of amplifier 134 is identified in FIG. 6 and the ensuing description as $E_v$. The output signal $E_v$ is fed back on a signal path 136 to D/A converter 124 in which it constitutes a reference voltage source $E_s$. The digital to analog converter has a gain k volts per volt of $E_s$ when all the binary digits N are turned on. Accordingly, the output of D/A converter 124, $E_f$ is equal to:

$$E_f = k \frac{N}{N_{limit}} E_s$$

where $$N_{limit} = \sum_{n=0}^{15} (1 \times 2^n) = 2 \times 2^{15} - 1$$

$$N = \sum_{n=0}^{15} (A_i \times 2^n)$$

$A_i = A_{n+1} = 1$ or $0$
$A_1$ = Least significant bit
$A_{16}$ = Most significant bit That the output voltage $E_v$ which is representative of the radial speed $v_{avg}$ inch/sec is equal to $K_c(E_{\Delta x}/N)$ volts is demonstrated by the following analysis:

$$\epsilon = E_{\Delta x} - E_f$$
$$= E_{\Delta x} - \frac{k N E_s}{N_{limit}}$$

when $\epsilon = 0$, $E_s = E_v$

Then $$E_{\Delta x} = \frac{k N E_v}{N_{limit}}$$

-continued $$E_v = \left(\frac{N_{limit}}{k}\right) \cdot \frac{E_{\Delta x}}{N}$$

$$E_v = K_c \left(\frac{E_{\Delta x}}{N}\right) \text{ volts}$$

in which $$K_c = \frac{N_{limit}}{k} = \text{calculation constant.}$$

How $E_v$ (volt) represents $v_{avg}$ (inch/sec) is demonstrated by the following analysis:
Let
  $K_T$ = Average Value Tachometer Gain (volt/inch/second)
  $K_p$ = Position Increment Gain (volt/inch)
  $N = N_1$ when counter counts clock CP at frequency $f_1$
  $N = N_2$ when counter counts clock CP 2 at frequency $f_2 (= f_1/2)$
  $N = N_4$ when counter counts clock CP 4 at frequency $f_4 (= f_1/4)$
Then for medium position increment $$\Delta x_2 = \Delta x_{ref} = \frac{E_{\Delta x} \text{ (volt)}}{K_p \text{ (volt/inch)}}$$

Average Value Tachometer output in volts is $$E_v = K_T \times v_{avg} = K_T (\text{volt/in/sec}) \times \frac{\Delta x_2 \text{ inch}}{\Delta t_2 \text{ second}}$$

$$= K_T \times \frac{E_{\Delta x}}{K_p} \times \frac{1}{N_2/f_2}$$

$$= (f_2 \times K_T/K_p) \frac{E_{\Delta x}}{N_2}$$

For small position increment $$\Delta x_1 = \frac{\Delta x_2}{2} \left(= \frac{\Delta x_{ref}}{2}\right)$$

$$E_v = K_T \times \frac{\Delta x_1}{\Delta t_1} = K_T \times \frac{E_{\Delta x}}{2K_p} \times \frac{1}{N_1/f_1}$$

$$= \left(f_2 \times \frac{K_T}{K_p}\right) \frac{E_{\Delta x}}{N_1}$$

For nonlinear region position increment
$\Delta x_4 = 2\Delta x_2 = 2\Delta x_{ref}$ $$E_v = K_T \cdot \frac{\Delta x_4}{\Delta t_4} = K_T \times \frac{2E_{\Delta x}}{K_p} \times \frac{1}{(N_4/f_4)}$$

$$= \left(f_2 \cdot \frac{K_T}{K_p}\right) \frac{E_{\Delta x}}{N_4}$$

Therefore $$E_v = \left(f_2 \cdot \frac{K_T}{K_p}\right) \frac{E_{\Delta x}}{N} \quad (N = N_1, N_2 \text{ or } N_4)$$

Setting calculation constant $$K_c = \frac{N_{limit}}{k} = f_2 \cdot \frac{K_T}{K_p}$$

Then $E_v = K_c E_{\Delta x}/N$)

If the maximum velocity (e.g. 75 inches/second) and the tachometer gain $K_T$ (e.g. 0.145 volt/inch/second) are known in the servo system, the maximum value of $E_v$ can be calculated. By designing the minimum count $N_2$ up to which the counter will count when the servo head travels across $\Delta x_2$ inches at the maximum velocity, one can calculate the necessary frequency of clock pulses generated by the oscillator and also the value of $K_c E_{\Delta x}$. $E_{\Delta x}$ which represents $\Delta x_2$ in voltage can be easily calculated when the position gain (e.g. 18 volts/2.7 milli-inches) is known. Since $N_{limit}$ is a fixed number, the gain k of the D/A converter can be deduced. The D/A converter gain k and the reference distance $E_{\Delta x}$ can be optimized with each other for design convenience provided $E_{\Delta x}/k$ is kept constant. The minimum count for $N_2$ cannot be too small and depends on the tolerable error of the tachometer because within any $\Delta t$ interval, the count N accumulated in the counter at the end of $\Delta t$ can vary by $\pm 1$ count, which affects the accuracy of maximum velocity. At low velocity such tolerance of N is not important because N is so large that the error due to $\pm 1$ count is negligible, but the maximum N cannot exceed the limit of the counter $N_{limit}$. It is thus seen that the output voltage $E_v$ of processor 66 is inversely proportional to N, the number of clock pulses accumulated in counter 62 between successive sampling pulses.

The D/A converter has a transfer function of $H = E_f/E_x = k N/N_{limit}$, which is variable depending on N. The three amplifiers 128, 130 and 134, all of which can be implemented as a high performance operational amplifier with external compensation capacitor like capacitor 132 for tailoring frequency characteristics, have a total open loop gain G. Therefore the loop gain of the processor 66 is GH with the D/A converter as the feedback element in accordance with well known control theory. At very low velocity, N is large, thus H is large too. As a result, the D.C. gain of GH will be much higher than that of G alone resulting in the second and possibly third order poles of the operational amplifier occurring at a frequency below the loop gain zero decibel crossover frequency. Since H is updated at each sample interval, this may cause a gain step change to an unstable loop configuration. In order to compensate for this, the compensation capacitor 132 is used to compensate the open loop gain G so that after compensation the open loop gain G acts like an integrator with the unity gain crossover frequency (bandwidth) shifted to a much lower frequency such that the increase in D.C. gain in GH due to maximum H is cancelled by the drop in G when the bandwidth of G is decreased. As a result, a good stability margin for the processor system at low velocity is maintained. At high velocity, N is small and the bandwidth of loop gain GH will be smaller than the case when N is large at slow velocity; the system is therefore even more stable.

The above description of FIG. 6 of the drawings is based on the assumption that AND gate 105 is enabled by the presence of an output signal from the D flip flop 106. Flip flop 106 produces an output +Enable Sampling when the head is travelling across servo tracks.

The flip flop has a low output when the data heads are sitting on data track. The input signals to flip flop 106 are derived from other portions of the servo control system which are conventional and were known before the present invention. Such input signals will be described in conjunction with the timing diagram of FIG. 7. The position control signals applied at input 46 in FIG. 3 produce a +Seek Start pulse 140. The trailing edge of the +Seek Start signal sets a +Seek In Process signal 142 which stays high until the head reaches the desired new radial position as shown in FIG. 7. There is also produced a +Cylinder signal 146 which, as can be seen in FIG. 7, is high when the servo head is on a data cylinder in the disc pack (i.e. midway between two adjacent servo tracks) and is low at all other positions. Referring to FIG. 6 it will be seen that the +Cylinder signal 146 is connected to an inverting clock input of flip flop 106 and that the +Seek In Process signal 142 is connected to the data input of the flip flop. Thus the output of flip flop 106 produces a signal 148 which is characterized as a +Enable Sampling signal because it enables AND gate 105. As indicated in FIG. 7, +Enable Sampling signal 148 is set to a high state when the servo head initially moves annd is reset when the head reaches the desired destination. Consequently, shift register 64 can be clocked and the counter 62 can be cleared by the sampling pulses only when the head is moving and a tachometer signal is needed.

The +Enable Sampling signal 148 produced by flip flop 106 also assures that at the destination, when the head velocity is almost zero, a value indicative of a long time period (a large value of N) will be supplied to D/A converter 124. To achieve such mode of operation the +Enable Sampling signal is connected over a signal path 150 through an inverter 152 and an OR gate 153 to the most significant bit (MSB) input of D/A converter 124. Thus when the servo head is on the destination cylinder and before it leaves that cylinder, the +Enable Sampling signal stays low, a large time indicative number is applied to the D/A converter so that an almost zero speed output is produced until processor 66 begins functioning again in response to the number of clock pulses counted between successive sampling pulses.

In the presence of acceleration or deceleration of the radial speed of the servo head, the average value tachometer output $E_v$ of processor 66 is a series of steps (discrete values) as seen in the lower curve of FIG. 7. Although the steps can be smoothed out by filtering, better accuracy, particulary at very low speeds, is achieved by employment of the circuit shown in FIG. 8, the operation of which can be appreciated by reference to the timing diagrams of FIG. 9.

Referring to FIG. 8, motor current integrator 72 is shown embodied by an operational amplifier 154 which has a capacitor $C_1$ in the feedback circuit and a series resistor $R_1$ at its input. It is well known that an operational amplifier so connected operates so that the signal produced at its output 74 is the time integral of the signal supplied to its input at a left terminal 155 of resistor $R_1$. The input signal applied to terminal 155 is coupled on a circuit path 156 from EMA motor 44 through a negative absolute magnitude circuit 157 and a FET switch 158. The input signal applied on path 156 from the EMA motor is a voltage having a magnitude proportional to motor acceleration.

In the upper portion of the circuit of FIG. 8 is an operational amplifier 160 which is connected as an inverter. To the input of operational amplifier 160 is connected the tachometer voltage output $E_v$. The output of operational amplifier 160 is connected to series resistors 162 and 164 each of which has resistance $R_2$. Resistors 162 and 164, operational amplifier 154 and capacitor $C_1$ constitute filter 68 which is a first order filter.

Coupling the average value tachometer signal from the output of operational amplifier 160 to filter 68 is a FET switch 165 which extends from the common point of resistors 162 and 164 to the input of operational amplifier 154. A FET switch 166 is connected in parallel with feedback capacitor $C_1$ of the integrator. At all times that the tachometer is needed to produce an output signal for velocity report (i.e. when +Seek In Process is high), FET switch 166 is open so that capacitor $C_1$ can store and maintain a charge. FET switches 158 and 165 are controlled during operation of the system by connection of their gate terminals to complementary outputs of a retriggerable single shot (monostable multivibrator) type timer 167 so that when FET switch 158 is open, FET switch 165 is closed and vice versa. The input of the timer is connected to +Sample/Hold signal 118 (see FIGS. 7 and 9) which occurs at the sampling pulses SP. The timer upon receipt of one of the Sample/Hold pulses produces a high output at Q which closes FET switch 165 so as to connect the average value tachometer signal $E_v$ from operational amplifier 160 to capacitor $C_1$ in order to charge the capacitor in correspondence with the velocity derived by the average value tachometer. Timer 167 has an output $\overline{Q}$ which is low when a +Sample/Hold pulse is applied to the input of the timer; when the $\overline{Q}$ output is low, FET switch 158 is open. When FET switch 165 is closed and FET switch 158 is open, operational amplifier 154 with resistors $R_1$, 162 and 164 and capacitor $C_1$ functions as a summing amplifier with first order low pass filter characteristics. The output 74 of operational amplifier 154 when timer 167 is triggered is a filtered average value tachometer signal. After timer 167 times out, FET switch 165 is open and FET switch 158 is closed so that operational amplifier 154 with capacitor $C_1$ and resistor $R_1$ as an integrator to fill in or smooth the tachometer signal produced at output 74. $R_1$ has much greater resistance than the resistance of $R_2$ (e.g., 40 times) so that during the transition or switching time of FET switches 158 and 165 tachometer output 74 is dominated by the filtered average value tachometer signal $E_v$ even if both FET switches momentarily close simultaneously. Therefore, the tachometer output 74 can be treated as the filtered average value tachometer when the timer 167 is activated so as to close FET switch 165 and to open FET switch 158. Whenever the retriggerable timer 167 times out during very low velocity, the operational amplifier configures as an integrator so that the integration of motor current can fill in between average value tachometer values during very low velocity at the output 74 as shown in FIG. 9. The bottom portion of FIG. 9 shows the average value tachometer before filter at the output of the operational amplifier 160 and the filtered average value tachometer at the output of operational amplifier 154 if the FET switch 165 remains closed all the time (i.e. no motor current fill-in). With the motor current integration applied momentarily as the tachometer signal at very low velocity, the continuous tachometer output looks like that in FIG. 9 if the smoothing function of the filter is removed for illustration. The duration of the output of timer 167 is governed by the time constant $C_1R_2$ so as to assure that the duration is long enough to update or correct the integrator output by charging the capacitor $C_1$ at low velocity. However, the $C_1R_2$ time constant is small enough that at low velocity, the average value tachometer output takes only a small portion of the period between sampling pulses to correct the integrator. The timer 167 can time out and open FET switch 165 (and thus close FET switch 158) only at very low speeds, i.e. only when the time between successive +Sample/Hold pulses supplied to the input of the timer is longer than the fixed output duration of the timer. At any speed greater than very low speed, the time between successive +Sample/Hold pulses is shorter than the output pulse width of the timer 167 so that the timer is retriggered continuously, the switch 165 remains closed, and the tachometer signal at the output 74 is constituted solely by the average value tachometer signal $E_v$ and not by the integration of motor current. In other words, since the duration of the retriggerable timer 167 is fixed and the period between sampling pulses varies with velocity, integration of motor current as tachometer output is used only momentarily at very low (e.g. below 7 inch/second) velocity. That is, the velocity at which the integration of motor current starts to fill in as the tachometer is defined by the output duration of the retriggerable timer 167. The contribution of the integration of motor current to the continuous tachometer output 74 increases gradually as the velocity decreases. Pure integration of motor current is not used as a tachometer signal because the D.C. drift and external force like friction or drag make unreliable a velocity report based solely on integration of motor current. But with the excellent correction by the average value tachometer signal $E_v$, the integration of motor current yields a very accurate continuous tachometer at very low velocity while the average value tachometer provides accurate tachometer at high velocities.

When the servo head has reached its destination and its radial speed is zero, the +Seek In Process signal goes low and such signal closes FET switch 166 to ensure that no charge is left in capacitor $C_1$ and thus produce a zero tachometer output which is appropriate for zero speeds. The velocity servo system at that time is taken over by the position servo system using the track following position signal information.

In the following description of the operation of the preferred embodiment of the invention, there are four modes of operation; they will be described in the order in which they are enumerated: (1) operation at startup when the head is first caused to move away from one cylinder location toward a target cylinder location; (2) operation when the servo head is moving radially at a relatively moderate speed; (3) operation when the servo head is moving radially at a relatively high speed; and (4) operation as the servo head approaches the target cylinder where it gradually slows and finally stops.

Operation at Startup

When the servo head is stationary, the +Seek In Process signal 142 (see FIG. 7) is low. Such low signal is coupled to an inverting auxiliary input 180 on counter 62 (see FIG. 6) which causes a large predetermined number $N_L$, e.g. $2^{15}$, to be loaded into the counter from a number generator 182. Such large number indicates that a very large $\Delta t$ and a correspondingly near zero speed is assumed as the initial tachometer output when the head is at the origin cylinder. When the counter is loaded with the large number, the counter stops counting the variable frequency clock and the output of the counter has the same number as the output of the number generator. Having reference to FIG. 3, when the radial position of servo head 40 is to be changed to another cylinder within the disc pack, a control signal is applied to input 46. Such control signal, among other things, powers EMA motor 44 so that radial movement in the proper direction commences. Additionally, (see FIG. 7) when the head starts to seek, such control signal generates a +Seek Start Signal 140 (see FIG. 7) in response to which the +Seek In Process signal 142 goes high and auxiliary input 180 is deactivated so that the counter starts counting the variable frequency clock. The +Seek Start signal also clocks shift register 64 through OR gate 107 (see FIG. 6) so as to transfer the large number $N_L$ from output of counter 62 into the shift register output so as to ensure that the D/A converter input is loaded with a big number in order to generate an almost zero initial tachometer output until the first +Sample/Hold pulse is sensed at the occurrence of the sampling pulse $Z_1$.

As seen in FIG. 7, +Seek In Process signal 142 remains in a high state until the servo head has arrived at the target cylinder. As the servo head moves from its start position, +Cylinder signal 146 goes low and this clocks the D flip flop 106. The output of flip flop 106 goes high to produce +Enable Sampling signal 148 because +Seek In Process signal 142 in high state is coupled to the data input of the flip flop. The +Enable Sampling signal 148 from flip flop 106 enables AND gate 105 to allow the sampling pulses to sample (transfer) and hold the count accumulated in the counter into the shift register 64. The sampling pulses are protected from noise generated from the noise or glitches of the position signal at very low velocity by means of substituting for the sampling pulses SP the output of the non-retriggerable monostable multivibrator 116 which is triggered by the sampling pulses SP.

Operation at Relatively Low Speeds

As the head moves away from the start position, it moves relatively slowly and is subject to acceleration. During such relatively slow movement the position signal produced by demodulator 52 is exemplified by curve 32 in FIG. 2 and FIG. 5B. Having reference to the circuit of FIG. 4, such relatively low speed reported by the tachometer is less than reference speed $V_m$ applied to comparator 85. Consequently the output of the comparator 85 will be high and such output applied on circuit path 86 to the D input of D flip flop 88 sets the Q output of the flip flop to a high state on occurrence of the first sampling pulse S. When the Q output of flip flop 88 is set high, AND gate 84 is enabled so that the sampling pulse SP at the output of OR gate 83 contains both sampling pulses S and Z as shown in FIG. 5B for the low velocity case. As seen in FIG. 6, such sampling pulses are conducted through OR gate 102, AND gate 105 and OR gate 107 to store the accumulated count of the counter 62 into the shift register 64 in response to the sampling pulse. Thus so long as the radial speed of the head is less than $V_m$, flip flop 88 is set high and AND gate 84 is enabled so that both the S sample pulses and the Z sample pulses are applied in the velocity calculation process to generate the average value tachometer.

When the Q output of flip flop 88 is set high, it maintains the input of AND gate 94 (see FIG. 4) in a low state and the input of AND gate 93 in a high state so that CP 2 is blocked and CP is allowed to pass to the input of OR gate 96. Consequently the clock pulse CP at a freuqency $f_1$ is conducted through OR gates 96, AND gate 97 and OR gate 101 to the input of counter 62 seen in FIG. 6. When the position signal is in linear region, the counter begins counting CP at a sampling pulse and is cleared by the pulse +Clear Counter at the next sampling pulse, which is at a distance $\Delta x_1$ from the last sampling pulse. At the occurrence of the second sampling pulse, the count stored in counter 62 is clocked into shift register 64 by the +Sample/Hold pulse and such count, which is representative of $\Delta t_1$, is processed in processor 66 to produce a signal representative of speed. A brief time after the shift register 64 is clocked, counter 62 is cleared and a new count at the clock rate $f_1$ is accumulated in counter 62. Thus at relatively low radial speeds of the head an average value calculation is made over a relatively short distance $\Delta x_1$ between successive sampling pulses S and Z in the linear position signal region.

As is known, the portions of position signal 32 near peak 26 are nonlinear. During the traverse of the nonlinear region of the position signal an average value tachometer calculation is made by the circuit of the present invention. Because the distance $\Delta x_4$ traveled by the head in traversing the nonlinear range $\Delta x_4$ is four times the distance $\Delta x_1$ between successive sampling pulses S and Z at low velocity (see FIG. 5B), a reduced clock frequency is employed for measuring the time required for traversal of the nonlinear region. This avoids the need of changing the reference distance of the processor 66. When the position signal exceeds the level 30 shown in FIG. 2, such condition is detected by position peak level detector 98 seen in FIG. 4 and the signal +Peak seen in FIGS. 5A and 5B is formed. When the position signal exceeds such level and enters into the nonlinear range, the output of the level detector on circuit path 99 goes high, thereby (through the action of inverter 100) disabling AND gate 97 and blocking clock pulse CP at frequency $f_1$. The high signal on circuit path 99 enables AND gate 202, however, which causes the clock pulse CP 4 at a relatively low clock frequency $f_4$ ($=f_1/4$) to be conducted through AND gate 202 and supplied to the input of synchronous counter 62 through the OR gate 101. Until the position signal again enters the linear range, counter 62 which counts CP 4 accumulates a value of $N_4$. When the position signal reenters the linear range, the output of peak level detector 98 goes low thereby disabling AND gate 202 and enabling AND gate 97. Additionally, as the position signal reenters the linear range, sampling pulse $S_3$ thus generated clocks the count $N_4$ accumulated in counter 62 into shift register 64 where it is supplied to processor 66 to produce an average value tachometer signal indicative of speed during traversal of the nonlinear range.

Operation at Relatively High Speeds

When the servo head moves at a relatively high speed exemplified in FIGS. 2 and 5B by curve 34, the time required for the position signal to vary between two successive sampling pulses S and Z is very small. The system of the present invention operates at relatively high speeds by sampling the position signal only between successive sampling pulses S. Referring to FIGS. 4 and 5B, when the tachometer output applied to comparator 85 has a magnitude greater than reference voltage $V_m$ the output of the comparator on signal path 86 goes low in response to which the Q output of flip flop 88 is switched low at the next sampling pulse S. This disables AND gate 84 so that only sampling pulses S are applied to the inputs of counter 62 and shift register 64 after passing through the control logic circuit 58. When the Q output of flip flop 88 goes low, the upper input of AND gate 93 also goes low so that the clock pulse signal CP is blocked from reaching the input of OR gate 96 AND gate 94 is enabled so that CP 2 is conducted to the input of OR gate 96, which therefore has CP 2 at its output. At the linear region of the position signal, AND gate 97 is enabled and AND gate 202 is disabled. Consequently the output of OR gate 101 is a clock pulse CP 2 at frequency $f_2$ ($=f_1/2$). The CP 2 signal applied to the input of counter 62 accumulates to $N_2$ during the distance $\Delta x_2$ between two successive sampling pulses S in the linear position signal region and the count is transferred to processor 66 in response only to sampling pulses S.

During operation at relatively fast speeds, the velocity calculation during the nonlinear portions of position signal P is the same as described previously in the low speed operation. That is to say, the $\Delta t_4$ value is represented by $N_4$, up to which the counter counts at frequency $f_4=f_1/4$ during the period when the head traverses through $\Delta x_4$ (the nonlinear region).

Operation at Slow Down and Arrival at Target Cylinder

As the servo head nears the target cylinder its speed is reduced to a very low speed. Such very low speed is compared with reference voltage $V_L$ supplied to comparator 110 (see FIG. 6). Whenever the actual speed is lower than $V_L$, the output of the comparator goes high to enable AND gate 114. When AND gate 114 is enabled, sampling pulses S and Z are conducted therethrough to nonretriggerable single shot multivibrator 116 so as to eliminate any false sampling pulses generated by the noise or glitches of the comparatively noisy position signal at very low speed. The duration of the signal produced by the single shot multiviorator is less than the minimum $\Delta t$ when the actual speed is lower than $V_L$, but is longer than the sampling pulses SP so as to reject noise spikes by means of its nonretriggerable characteristic. This is achieved when the output of the single shot is combined with the noisy SP by OR gate 102. The output of multivibrator 116 is indicated at 119 in FIG. 9, and so long as the output of comparator 110 is high, noise pulses present on the sampling pulse SP will not influence the average value tachometer output thereof. The output of multivibrator 116 constitutes the +Sample/Hold command signal at the input of timer 167 (see FIG. 8), the output of which closes FET switch 165 and opens FET switch 158 of FIG. 8 at proper times to update the voltage on integrator capacitor $C_1$ by the average value tachometer signal during very slow speed as seen in FIG. 9. The FET switch 165 is closed at any speed other than very low speed, which is defined by the output duration of the timer 167. When FET switch 165 is closed, the continuous tachometer signal at output 74 is constituted solely by the average value tachometer.

As the speed of head travel decreases to a point at which the time between successive sampling pulses is bigger than the duration of the output of monostable multivibrator 167, there is time for the Q output of the multivibrator to switch to a low state and for the $\overline{Q}$ output to switch to a high state. Thus as the heads approach the target cylinder, the continuous tachometer output 74 is formed by the output of motor current sample integrator 72 in alternation with the average value tachometer signal $E_v$ at progressively shorter intervals until the head eventually reaches the target cylinder. The contribution of motor current integration to the continuous tachometer increases as the velocity decreases. Referring to FIG. 7, when the head reaches the target cylinder, circuitry not constituting a part of the present invention resets the +Seek In Process signal which in turn causes the +Enable Sampling signal 148 at the output of flip flop 106 (see FIG. 6) to go to the low state. When the +Enable Sampling signal 148 is in the low state, gate 105 is disabled so that no further +Sample/Hold pulses are applied to the shift register 64. That is, the velocity calculation ceases. When the +Eanble Sampling signal 148 goes low, the most significant bit input to D/A converter 124 is activated through inverter 152 and OR gate 153 so that an almost zero speed signal will be produced at the target cylinder until the tachometer of the invention is next activated for another seek movement.

Conclusion

Thus it will be seen that the present invention provides a tachometer system that is based upon the calculation of average value of velocity and is extremely accurate, stable and immune to noise. Because the tachometer signal is generated by digital techniques, great accuracy can be achieved and maintained. In addition, because different clock pulse frequencies are used at different modes of operation of the system, the circuitry for calculation is uncomplex. Thus the invention can be employed to give accurate results even in systems where the track density on the disc pack surfaces is far greater than presently employed. Although one embodiment of the invention has been shown and described, it will be obvious that other adaptations and modifications can be made without departing from the true spirit and scope of the invention.

What is claimed is:

1. A tachometer for a disc pack servo system comprising means for generating a triangular position signal in response to radial movement of a servo head with respect to a prerecorded servo track, said position signal having ascending and descending linear portions each of which has a slope representative of the rate of radial movement of the servo head, means responsive to the linear portion of said position signal for producing at least first, second and third sampling pulses on attainment of said position signal of respective first, second and third voltage levels, the difference between said voltage levels being equal and representing equal increments of radial movement of said servo head, a counter having a reset input connected to said sampling pulse producing means, said counter having a counting input and being constructed and arranged to terminate counting of pulses supplied to said counting input in response to receipt of a sampling pulse at said reset input, a clock pulse source producing a series of regularly recurring clock pulses connected to said counting input so that said counter produces a number N at its output which is representative of the time between adjacent said sampling pulses, a digital to analog converter having a digital input to which N is connected, said converter having a capacity $N_{limit}$, a gain k and a reference voltage input and being constructed and arranged to produce an output equal to the product of k, $(N/N_{limit})$ and the voltage connected to said reference input, a difference circuit having a first input connected to said converter output and a second input to which a reference voltage is connected, said difference circuit being constructed and arranged to produce a voltage proportional to the difference between the voltage applied to said first and second inputs, and feedback means for feeding back to the reference voltage input of said converter the output of said difference circuit so that the voltage at a circuit point between the output of said difference circuit and the reference input of said converter is inversely proportional to N and is indicative of average radial speed of said servo head.

2. A tachometer according to claim 1 including means coupled to said circuit point for producing a high speed signal in response to attainment of a radial speed greater than a preselected medium speed, means coupled to said high speed signal producing means for decoupling said second sampling pulse, and means coupled to said high speed signal producing means for halving the rate of clock pulses produced by said clock pulse source in response to a radial speed greater than said preselected medium speed.

3. A tachometer according to claim 1 wherein said triangular position signal has a nonlinear peak portion between said ascending and descending linear portions, means for producing a fourth sampling pulse when said position signal enters said peak at said ascending portion and means for generating a fifth sampling pulse when said position signal returns from said peak to said descending linear portion, the levels at which said fourth and fifth sampling pulses are produced being substantially equal to one another and the level through which said position signal traverses between said fourth and fifth sampling pulses being equal to four times the difference between the levels at which said first and second sampling pulses are produced, and means initiated by said fourth sampling pulse and terminated by said fifth sampling pulse for quartering the rate of clock pulses from said clock pulse source.

4. A tachometer according to claim 1 wherein said feedback means includes a high gain amplifier coupled between the output of said difference circuit and said circuit point, said amplifier being constructed and arranged to integrate over time the output of said difference amplifier to afford frequency compensation of the voltage fed back to the reference voltage input of said converter.

5. A tachometer according to claim 1 including an electromagnetic actuator operatively associated with said servo head for establishing the position of said servo head in response to input current supplied to said actuator, means for integrating said input current to produce an integrated signal representative of radial speed of said servo head, means responsive to very slow speed of said servo head for producing a slow speed signal, and means responsive to said slow speed signal for alternately switching between the signal at said current point and said integrated signal.

6. A tachometer according to claim 5 including a nonretriggerable monostable multivibrator having an input, means for effecting coupling of said sampling pulses to said multivibrator input in response to very slow speed of said servo head, said multivibrator having an output terminal and being constructed and arranged to produce at said output terminal a pulse having a duration greater than that of said sampling pulses and less than the period between successive sampling pulses at said very slow speed so as to avoid false resetting of said counter by noise pulses intermixed with said sampling pulses.

7. A tachometer according to claim 1 in combination with means for producing a Seek In Process signal at commencement of radial movement of said servo head, number generator means coupled to last said producing means for generating a large number in response to said Seek In Process signal, and means coupling said large number to said counter so that at the commencement of radial movement of said servo head the number N is large and is representative of a slow servo head speed.

8. A tachometer according to claim 1 in combination with a shift register coupled between the output of said counter and the input of said digital to analog converter, said shift register having a clock input for causing the count from said counter to be transferred to said converter, means for connecting said sampling pulses to said clock input, and means for delaying the sampling pulses supplied to the reset input to said counter to form a delayed sampling pulse so that on the occurrence of a sampling pulse, the count N in said counter is transferred by said shift register to said converter before said counter is cleared by said delayed sampling pulse.

* * * * *